Patented Mar. 23, 1937

2,074,349

UNITED STATES PATENT OFFICE 2,074,349

CELLULOSIC PELLICLES AND METHOD FOR PREPARING SAME

William Frederick Underwood, Buffalo, N. Y., assignor, by mesne assignments, to E. I. du Pont de Nemours & Company, Wilmington, Del., a corporation of Delaware No Drawing. Application August 18, 1934, Serial No. 740,531

14 Claims. (Cl. 18—57)

This invention relates to cellulosic structures, and more particularly it relates to a method for softening cellulosic structures by the incorporation therein of softening agents, and the product resulting therefrom.

In the manufacture of cellulosic materials precipitated from aqueous solutions, such as regenerated cellulose pellicles, including sheets or films, caps, bands, continuous tubing, artificial straw and the like, it has long been customary to incorporate into the cellulosic pellicle a softening agent in order to maintain it in a flexible condition. Such cellulosic pellicles which are free from a softening agent are known to be quite brittle and while a softener-free pellicle may find certain uses, the softened and therefore flexible sheet or film is much more generally useful. Heretofore, as softeners for regenerated cellulose pellicles, the art has employed such substances as ethylene glycol, propylene glycol, diethylene glycol, glycerol, and the like, but, of these, by far the most important is glycerol which has hitherto known no equal as a softening agent for producing flexible, transparent and durable cellulosic pellicles such as those of regenerated cellulose. Despite the numerous advances which have have been made in the production and development of cellulosic pellicles, no softening agent has thus far been found which can be successfully applied as a substitute for glycerol without seriously restricting the utility of the product.

Glycerol is obtained commercially primarily as a by-product from the soap industry. As a by-product, the quantity may be limited and hence glycerol is subject to market fluctuations of supply as well as price. The glycols, mentioned above as useful cellulose softeners, are for the most part obtained synthetically and consequently they are relatively expensive. For an industry consuming large amounts of these materials, therefore, the development of less expensive equivalents or means for reducing the consumption of expensive materials will lead to marked economies in production.

It has now been found that particularly desirable softness can be imparted to cellulosic structures of the type above referred to by the incorporation therein of a water-soluble nitrogen-containing compound selected from the group consisting of solid amides, amines, compounds containing condensed or heterocyclic nuclei of amide character and hydroxy-alkyl derivatives of ammonia. These substances may replace glycerol in whole or in part as will appear more specifically hereinafter.

It is therefore an object of this invention to provide a new and useful method for preparing cellulosic pellicles having a satisfactory rigidity, elongation, flexibility, durability and transparency.

It is a further object of this invention to provide a cellulosic pellicle treated with a softening agent which will not interfere with any subsequent treatment of the cellulosic pellicle, such as the application of surface coatings, ink, coloring matter, adhesives, or the like.

A still further object of this invention is to provide a rigid, flexible, transparent, durable, cellulosic pellicle such as a sheet or film of regenerated cellulose suitable for use as a wrapping tissue, treated with a softening agent comprising a solid amide, amine, compound containing condensed or heterocyclic nuclei of amide character or a hydroxyalkyl derivative of ammonia.

Other objects of the invention will appear hereinafter.

By the term "rigidity" or its equivalent as used herein is meant that property which is the opposite of limpness, in other words, rigidity in the sense that the pellicle can be advanced in a wrapping machine or similar apparatus without curling, crumpling, or otherwise fouling the machine.

The term "durability" is used to define resistance to shock or rough handling. Thus, for example, bags may be fabricated from the pellicles and filled with some standard material such as a certain weight of dried beans and the package sealed, whereupon the durability may be measured against a known standard by tumbling the package under standard conditions and noting the resistance to breakage of the wrapper.

The objects of this invention can be attained generally by substituting a water-soluble compound from the group comprising solid amides, amines, compounds containing condensed or heterocyclic nuclei of amide character, or a hydroxyalkyl derivative of ammonia for glycerol as a softening agent. These substances can be substituted in whole or in part for the glycerol. For convenience, the invention will be described in terms of the use of carbamide in this capacity, but it is to be understood that other substances of the classes mentioned above can also be used and this will be more specifically discussed hereinafter.

As a base, the invention contemplates the use of any cellulosic structure, particularly of pellicular nature such as a sheet or film, artificial straw, cap, band or continuous tube, such as may be obtained by the coagulation and/or regeneration from an aqueous cellulosic dispersion in accordance with the procedure customary to the art. Thus, the invention comprehends the use of regenerated cellulose pellicles such as may be obtained from the viscose or cuprammonium processes, glycol cellulose, cellulose glycollic acid, lowly esterified or lowly etherified cellulose derivatives where there is only one ether or ester group associated with several cellulose units, and other cellulosic structures of similar character. Similarly, various types of paper, especially of the "glassine" type may be used as base materials. Sheets of albuminous materials including gelatin, casein, or the like, may also be used. As a matter of convenience, the invention will be described in terms of its application to the softening of regenerated cellulose pellicles such as those sheets or films of regenerated cellulose which are suitable for use as wrapping tissues.

In the manufacture of regenerated cellulose sheets or films, as for example by the viscose process, the cellulosic dispersion is cast through suitable apparatus into coagulating and/or regenerating baths from which it is finally obtained in the form of a continuous cellulosic sheet which is customarily led in a continuous manner through a series of purifying, bleaching and washing operations. Just prior to the drying operation which is also usually continuous and coordinated with the casting operation, the film is passed through a bath containing a softening agent in such concentration that after the excess liquid has been removed from the surface of the sheet by suitable squeeze rolls and the excess moisture removed by passage through the drier, the final sheet can be wound up in a continuous fashion and will contain an appropriate predetermined amount of softening agent. The commercially available regenerated cellulose film contains approximately 4-8% moisture and depending upon the particular uses to which the product is destined, the softening agent, usually glycerol, may vary from about 8-25%, based on the combined weight of the cellulose and softening agent in the sheet.

The invention contemplates subjecting the base sheet or film to a bath containing carbamide in aqueous solution or in solution in an organic solvent. After treatment with the carbamide solution, the base is dried and may subsequently be provided with a surface coating, such as a moistureproof film or coating. Furthermore, when the softening agent is soluble in the solvent of the surface coating, the base may be treated with the softening agent simultaneously with the application of the coating composition. In this latter case, the softening agent to be applied simultaneously with the coating solution, is added or incorporated in the coating composition.

The quantity of carbamide introduced into the base depends upon the composition of the base and the desired degree of flexibility in the final product and hence may vary within wide limits. Satisfactory results have been secured with a regenerated cellulose base when 5% to 19% or more, and preferably 15 to 18%, of carbamide is contained in the final product. The percentages stated above are based on the combined weight of cellulose and softener in the final product. When the final product contains less than 5% carbamide or the like, it will not have the desired degree of softness, and when the product has a carbamide content exceeding 19%, it often presents a slightly hazy appearance which is usually objectionable.

In accordance with the preferred form of this invention, a sheet or film of regenerated cellulose is passed through an aqueous bath containing carbamide, the excess bath being removed in any suitable manner, such as, for example, by squeeze rolls, wipers, and the like, and the film dried subsequently thereto. Inasmuch as the softening agents contemplated by this invention are stable and substantially non-volatile at ordinary temperatures, it is immaterial whether or not a surface coating is applied thereto, nor is it material whether or not a surface coating is applied immediately after treatment with a softening agent or after a considerable lapse of time.

It may, at times, be desirable to incorporate the softening agent in the sheet or film from a solution of the same in an organic solvent, such as, for example, alcohol, acetone, diethyl ether, toluene, benzene, or ethoxyethanol. In such case, the water in the gel regenerated film is preferably first displaced with a quantity of the solvent in which the softener is dissolved, after which the softening agent in solution is applied thereto. Where a solvent for a softener is used which is immiscible in water, the water will preferably first be removed by displacement with an intermediate liquid material which is miscible with both the softener solvent and water, after which the said intermediate material is displaced with a quantity of the softener solvent prior to treatment with the softener solution.

The total amount of softener is controlled primarily by the total amount of softening agent in the treating bath, although the film thickness, rate of passage through the bath, temperature of the bath, etc. may also contribute thereto to a certain extent. The regenerated cellulose pellicle, upon reaching the treating bath, is in a highly swollen and hydrated condition and usually the cellulose of the pellicle is associated with 300% or more of water. This highly swollen and wet pellicle, usually referred to as the gel sheet, is impregnated with the treating bath and because of the large amount of water associated with the cellulose, it is apparent that the removal of this water during the drying operation will concentrate the softening agent with respect to the cellulose content of the pellicle. For example, if a regenerated cellulose pellicle containing about 15% total softener is desired as a final product, the concentration of the softener in the treating bath will be adjusted to approximately one-third that value, or about 5%. This is particularly true when the softening agents are, like carbamide, substantially non-volatile and are not vaporized during the drying operation.

The following examples will illustrate the practice of the invention, it being understood that the invention is not to be limited thereby:

*Example I.*—A sheet or continuous film of gel regenerated cellulose, which will have a final dry thickness of about 0.0012", is immersed in or drawn through a bath consisting of a 5% aqueous solution of tetramethyl phthalamide. The sheet or film is allowed to remain in contact with the bath for a time sufficient to permit the establishment of equilibrium (preferably not longer than five minutes) whereupon the excess liquid is removed by suitable devices such as scraper rods, squeeze rolls, blotters or the like. The film is then dried in such a manner as will maintain it substantially free from wrinkles, the drying temperature being of the order of 70° C. The resultant film is clear, non-greasy and quite soft.

*Example II.*—Same as Example I but using tetramethyl adipamide.

*Example III.*—Same as Example I but using a 5% aqueous solution of acetamide. The product is soft, clear and possesses good surface.

*Example IV.*—Same as Example I but using a 3% aqueous solution of carbamide. The surface of the film is good and the film is clear and soft.

*Example V.*—Same as Example I but using a 5% aqueous solution of triethanolamine.

*Example VI.*—A sheet or continuous film of gel regenerated cellulose, which will have a final dry thickness of about 0.0012", is immersed in or drawn through a bath of ethyl alcohol in order to remove the major portion of water and replace the water with alcohol. The film is then treated in the manner indicated in Example I, using a bath consisting of a 5% alcoholic solution of dimethyl lauramide, the drying being carried out at about 70° C. The final product is clear, soft, and possesses good surface.

*Example VII.*—Same as Example VI, using a 5% alcoholic solution of tetramethyl adipamide.

All of the above examples have been set forth in terms of a sheet or film of gel regenerated cellulose. Obviously, this is the more practical way of practicing the invention since the softening agent is customarily incorporated into the sheet or film while the latter is in the gel state and during the normal course of manufacture. If one desires to impregnate an already dried regenerated cellulose film with a softener of the character described, it is possible to rewet the dried film so as to render it highly swollen, whereupon it may be treated with treating baths similar to those described but of composition suitable for obtaining the final product desired. In the same way, any of the sheets set forth as equivalent to regenerated cellulose sheets can be substituted in the specific examples cited above.

In the place of carbamide, numerous other substances can be used. Obviously, to serve as an equivalent for carbamide, a substance should be soluble in water or in an organic solvent such as those mentioned above; preferably, it should possess a normally low vapor pressure in order that it may not be lost in appreciable quantities during the drying operation. It should furthermore be substantially odorless and tasteless unless the softened pellicle is provided with a surface coating. The softener should be such that when incorporated into the pellicle, it will be substantially clear and colorless and approximately neutral.

As stated above, the substances capable of fulfilling the requirements of the invention include those which may be selected from the group consisting of solid amides, amines, compounds having condensed or heterocyclic nuclei of amide character, and hydroxyalkyl derivatives of ammonia. As specific substances belonging to the first classification may be mentioned carbamide, tetramethyl phthalamide, tetramethyl adipamide, dimethyl lauramide, acetamide, glycol amide, oxamide, succinamide, mono-methyl carbamide, p-phenytyl carbamide, and the like, or derivatives thereof. As substances which may be considered as falling in the second and third classifications may be mentioned cyanuric acid, melamine, hexamethylene tetramine and p-toluene sulfonamide. As representative members of the fourth class may be mentioned triethanolamine and homologues of this substance such as tripropanol- or tributanolamine. As substances which may be considered as falling in more than one of the classes mentioned, we may include dicyandiamide and thiocarbamide.

It is furthermore to be understood that two or more of the softening agents above mentioned may be used in combination with each other, or one or more of the above mentioned softening agents may be used in combination with one or more known softening agents, for example, a mixture of carbamide and glycerol in the ratio of 2:1 will operate to very good advantage.

If a colored cellulosic pellicle is desired, it may be obtained in any of the ways commonly known in the art including the passage of the sheet or film through a bath containing a suitable dyestuff. If desired, the dyestuff may be added to the bath used for introducing the softening agent. In the same way, after the film has been treated with the softening agent, it may be subjected to any of the customary after-treatments such as sizing or coating, or the like, which may be customarily given to cellulosic pellicles of the type described in just the same manner that a glycerol softened regenerated cellulose film, for example, may be treated.

The instant invention offers numerous advantages over the prior art means for softening cellulosic pellicles. Since the newly described softening agents are generally solid substances at ordinary temperatures, the control of concentrations used for treating baths is greatly simplified. Because of their crystalline nature, the softening agents are available in highly purified condition and, consequently, improve the quality of the final product. Since they can be obtained synthetically, they are available in unlimited quantity independent of a natural source. The use of the newly described softening agents results in a product having satisfactory physical characteristics, particularly transparency, flexibility, durability, and the like.

The softeners set forth by this invention have been described in terms of their use in connection with the softening of cellulosic pellicles, but it should be understood that such softeners are useful in other roles such as those normally played by such substances as glycerol.

Since it is obvious that various changes and modifications may be made in the above description without departing from the nature and spirit thereof, it is to be understood that the invention is not to be limited thereto except as set forth in the appended claims.

I claim:

1. A cellulosic pellicle capable of being produced from an aqueous alkaline cellulosic dispersion coagulated in an acid coagulating bath containing a water-soluble amide which is solid at room temperature as a softener therefor.

2. A cellulosic pellicle capable of being produced from an aqueous alkaline cellulosic dispersion coagulated in an acid coagulating bath containing carbamide as a softener therefor.

3. In a method for the production of flexible, durable pellicles the steps comprising forming a thin pellicle from an aqueous alkaline cellulosic dispersion and coagulating the same in an acid coagulating bath, and treating said cellulosic pellicle with a solution containing a water-soluble amide which is solid at room temperature as a softener therefor.

4. In a method for the production of flexible, durable pellicles the steps comprising forming a thin regenerated cellulose pellicle from an aqueous alkaline cellulosic dispersion and coagulating the same in an acid coagulating bath, and treating said cellulosic pellicle with a solution containing a water-soluble amide which is solid at room temperature as a softener therefor.

5. In a method for the production of flexible, durable pellicles the steps comprising forming a thin pellicle from an aqueous alkaline cellulosic dispersion and coagulating the same in an acid coagulating bath, and treating said cellulosic pellicle with an aqueous solution containing a water-soluble amide which is solid at room temperature as a softener therefor.

6. In a method for the production of flexible, durable pellicles the steps comprising forming a thin pellicle from an aqueous alkaline cellulosic dispersion and coagulating the same in an acid coagulating bath, and treating said cellulosic pellicle with a water-soluble amide which is solid at room temperature as a softener in an organic solvent.

7. In a method for the production of flexible, durable pellicles the steps comprising forming a thin pellicle from an aqueous alkaline cellulosic dispersion and coagulating the same in an acid coagulating bath, and treating said cellulosic pellicle with a solution containing carbamide as a softener therefor.

8. In a method for the production of flexible, durable pellicles the steps comprising forming a thin pellicle from an aqueous alkaline cellulosic dispersion and coagulating the same in an acid coagulating bath, and treating said cellulosic pellicle with a solution containing tetramethyl phthalamide as a softener therefor.

9. In a method for the production of flexible, durable pellicles the steps comprising forming a thin regenerated cellulose pellicle from an aqueous alkaline cellulosic dispersion and coagulating the same in an acid coagulating bath, and treating said regenerated cellulose pellicle with a solution containing carbamide as a softener therefor.

10. In a method for the production of flexible, durable pellicles the steps comprising forming a thin pellicle from an aqueous alkaline cellulosic dispersion and coagulating the same in an acid coagulating bath, and treating said cellulosic pellicle, prior to the drying thereof, with an aqueous solution containing carbamide as a softener therefor.

11. In a method for the production of flexible, durable pellicles the steps comprising forming a thin regenerated cellulose pellicle from an aqueous cellulosic dispersion, and treating said regenerated cellulose pellicle with carbamide dissolved in an organic solvent as a softener therefor.

12. A flexible, durable pellicle comprising regenerated cellulose and carbamide as a softener therefor.

13. A cellulosic pellicle produced from an aqueous alkaline cellulosic dispersion coagulated in an acid coagulating bath containing a solid carbamide as a softener therefor.

14. A cellulosic structure produced from an aqueous alkaline cellulosic dispersion coagulated in an acid coagulating bath containing a water-soluble amide which is solid at room temperature as a softener therefor.

WILLIAM FREDERICK UNDERWOOD.

---

CERTIFICATE OF CORRECTION.

Patent No. 2,074,349.            March 23, 1937.

WILLIAM FREDERICK UNDERWOOD.

It is hereby certified that error appears in the printed specification of the above numbered patent requiring correction as follows: Page 3, second column, lines 58 and 63, claims 1 and 2 respectively, strike out the words "capable of being"; and that the said Letters Patent should be read with these corrections therein that the same may conform to the record of the case in the Patent Office.

Signed and sealed this 25th day of May, A. D. 1937.

(Seal)                                               Henry Van Arsdale
                                                      Acting Commissioner of Patents.

4. In a method for the production of flexible, durable pellicles the steps comprising forming a thin regenerated cellulose pellicle from an aqueous alkaline cellulosic dispersion and coagulating the same in an acid coagulating bath, and treating said cellulosic pellicle with a solution containing a water-soluble amide which is solid at room temperature as a softener therefor.

5. In a method for the production of flexible, durable pellicles the steps comprising forming a thin pellicle from an aqueous alkaline cellulosic dispersion and coagulating the same in an acid coagulating bath, and treating said cellulosic pellicle with an aqueous solution containing a water-soluble amide which is solid at room temperature as a softener therefor.

6. In a method for the production of flexible, durable pellicles the steps comprising forming a thin pellicle from an aqueous alkaline cellulosic dispersion and coagulating the same in an acid coagulating bath, and treating said cellulosic pellicle with a water-soluble amide which is solid at room temperature as a softener in an organic solvent.

7. In a method for the production of flexible, durable pellicles the steps comprising forming a thin pellicle from an aqueous alkaline cellulosic dispersion and coagulating the same in an acid coagulating bath, and treating said cellulosic pellicle with a solution containing carbamide as a softener therefor.

8. In a method for the production of flexible, durable pellicles the steps comprising forming a thin pellicle from an aqueous alkaline cellulosic dispersion and coagulating the same in an acid coagulating bath, and treating said cellulosic pellicle with a solution containing tetramethyl phthalamide as a softener therefor.

9. In a method for the production of flexible, durable pellicles the steps comprising forming a thin regenerated cellulose pellicle from an aqueous alkaline cellulosic dispersion and coagulating the same in an acid coagulating bath, and treating said regenerated cellulose pellicle with a solution containing carbamide as a softener therefor.

10. In a method for the production of flexible, durable pellicles the steps comprising forming a thin pellicle from an aqueous alkaline cellulosic dispersion and coagulating the same in an acid coagulating bath, and treating said cellulosic pellicle, prior to the drying thereof, with an aqueous solution containing carbamide as a softener therefor.

11. In a method for the production of flexible, durable pellicles the steps comprising forming a thin regenerated cellulose pellicle from an aqueous cellulosic dispersion, and treating said regenerated cellulose pellicle with carbamide dissolved in an organic solvent as a softener therefor.

12. A flexible, durable pellicle comprising regenerated cellulose and carbamide as a softener therefor.

13. A cellulosic pellicle produced from an aqueous alkaline cellulosic dispersion coagulated in an acid coagulating bath containing a solid carbamide as a softener therefor.

14. A cellulosic structure produced from an aqueous alkaline cellulosic dispersion coagulated in an acid coagulating bath containing a water-soluble amide which is solid at room temperature as a softener therefor.

WILLIAM FREDERICK UNDERWOOD.

---

CERTIFICATE OF CORRECTION.

Patent No. 2,074,349.    March 23, 1937.

WILLIAM FREDERICK UNDERWOOD.

It is hereby certified that error appears in the printed specification of the above numbered patent requiring correction as follows: Page 3, second column, lines 58 and 63, claims 1 and 2 respectively, strike out the words "capable of being"; and that the said Letters Patent should be read with these corrections therein that the same may conform to the record of the case in the Patent Office.

Signed and sealed this 25th day of May, A. D. 1937.

(Seal)

Henry Van Arsdale
Acting Commissioner of Patents.

CERTIFICATE OF CORRECTION.

Patent No. 2,074,349. March 23, 19[37]

WILLIAM FREDERICK UNDERWOOD.

It is hereby certified that error appears in the printed specificat[ion] of the above numbered patent requiring correction as follows: Page 3, second column, lines 58 and 63, claims 1 and 2 respectively, strike ou[t] the words "capable of being"; and that the said Letters Patent should read with these corrections therein that the same may conform to the record of the case in the Patent Office.

Signed and sealed this 25th day of May, A. D. 1937.

Henry Van Arsdale
Acting Commissioner of Patent[s]

(Seal)